United States Patent
Xu et al.

(10) Patent No.: US 11,442,285 B2
(45) Date of Patent: Sep. 13, 2022

(54) DIFFRACTIVE OPTICAL ELEMENT AND PREPARATION METHOD

(71) Applicant: ORBBEC INC., Guangdong (CN)

(72) Inventors: Xing Xu, Guangdong (CN); Xu Chen, Guangdong (CN)

(73) Assignee: Orbbec Inc., Shenzhen (CN)

(*) Notice: Subject to any disclaimer, the term of this patent is extended or adjusted under 35 U.S.C. 154(b) by 242 days.

(21) Appl. No.: 16/510,446

(22) Filed: Jul. 12, 2019

(65) Prior Publication Data
US 2019/0339541 A1 Nov. 7, 2019

Related U.S. Application Data

(63) Continuation of application No. PCT/CN2018/071985, filed on Jan. 9, 2018.

(30) Foreign Application Priority Data

Sep. 8, 2017 (CN) .......................... 201710806581.1

(51) Int. Cl.
*G02B 27/48* (2006.01)
*G02B 27/42* (2006.01)

(52) U.S. Cl.
CPC ......... *G02B 27/48* (2013.01); *G02B 27/4205* (2013.01); *G02B 27/425* (2013.01); *G02B 27/4266* (2013.01)

(58) Field of Classification Search
CPC .. G02B 27/48; G02B 27/4205; G02B 27/425; G02B 27/4266; G02B 27/0944; G02B 27/4233; G02B 27/4272; G02B 27/4277
(Continued)

(56) References Cited

U.S. PATENT DOCUMENTS 9,686,839 B1 6/2017 Chern et al.
9,915,827 B2 3/2018 Gordon
(Continued)

FOREIGN PATENT DOCUMENTS

CN 102640087 A 8/2012
CN 103309137 A 9/2013
(Continued)

OTHER PUBLICATIONS

First Search dated Apr. 23, 2019, issued in related Chinese Application No. 201710806581.1 (1 page).
(Continued)

*Primary Examiner* — Audrey Y Chang
(74) *Attorney, Agent, or Firm* — Sheppard Mullin Richter & Hampton LLP

(57) ABSTRACT

A diffractive optical element for a structured light projection module and a method of using the diffractive optical element are described herein. The diffractive optical element is configured to: receive two-dimensional patterned beams and generate multi-order diffractive beams, wherein the two-dimensional patterned beams are emitted from a structured light projection module, the structured light projection module includes a light source comprising a plurality of sub-light sources arranged in a two-dimensional array, and the two-dimensional patterned beams correspond to the two-dimensional array; and project a plurality of two-dimensional patterned beams, wherein each of the plurality of two-dimensional patterned beams creates a corresponding duplicated pattern, and the duplicated patterns form a speckle pattern having uniform speckle density. The two-dimensional patterned beams can overlap with each other, or not overlap with each other.

8 Claims, 6 Drawing Sheets

(58) Field of Classification Search
USPC .................. 382/154; 359/569, 558; 356/625
See application file for complete search history.

(56) References Cited

U.S. PATENT DOCUMENTS

| | | | |
|---|---|---|---|
| 9,946,089 B2* | 4/2018 | Chen | ................ F21V 5/004 |
| 2012/0105855 A1 | 5/2012 | Miyasaka et al. | |
| 2012/0236288 A1 | 9/2012 | Stanley | |
| 2013/0038881 A1* | 2/2013 | Pesach | ................ G06T 7/521 |
| | | | 356/610 |
| 2014/0211215 A1 | 7/2014 | Pesach et al. | |
| 2016/0377414 A1* | 12/2016 | Thuries | ............ G02B 27/1093 |
| | | | 356/625 |
| 2017/0188016 A1 | 6/2017 | Hudman et al. | |
| 2018/0038685 A1 | 2/2018 | Torri et al. | |

FOREIGN PATENT DOCUMENTS

| | | |
|---|---|---|
| CN | 105705964 A | 6/2016 |
| CN | 205350880 U | 6/2016 |
| CN | 106292144 A | 1/2017 |
| CN | 106406002 A | 2/2017 |
| CN | 106461378 A | 2/2017 |
| CN | 106569330 A | 4/2017 |
| CN | 107450190 A | 12/2017 |
| WO | 2016024200 A2 | 2/2016 |
| WO | 2016/138143 A1 | 9/2016 |
| WO | 2017/069954 A1 | 4/2017 |

OTHER PUBLICATIONS

First Office Action dated Apr. 30, 2019, issued in related Chinese Application No. 201710806581.1, with English machine translation (11 pages).

PCT International Preliminary Report on Patentability dated Mar. 19, 2020, issued in related International Application No. PCT/CN2018/071985, with English translation (11 pages).

PCT International Search Report and the Written Opinion dated May 30, 2018, issued in related International Application No. PCT/CN2018/071985 (11 pages).

* cited by examiner

DIFFRACTIVE OPTICAL ELEMENT AND PREPARATION METHOD

CROSS-REFERENCE TO RELATED APPLICATIONS

This is a continuation of International Application No. PCT/CN2018/071985, filed on Jan. 9, 2018, which is based on and claims priority to and benefits of Chinese Patent Application No. 201710806581.1, filed with the State Intellectual Property Office (SIPO) of the People's Republic of China on Sep. 8, 2017. The entire contents of all of the above-identified applications are incorporated herein by reference.

TECHNICAL FIELD

The present disclosure relates to a diffractive optical element and a method of using the diffractive optical element to configure a structured light projection module.

BACKGROUND

The 3D imaging technology is important for next-generation human-computer interaction. As the 3D imaging technology becomes rigid requirements of mobile terminal devices, depth cameras may be widely used in mobile terminal devices. The depth cameras are developed with low power, high performance, and small size. The structured light projection module is an important part in a depth camera that is based on a structured light technology, and main components of the structured light projection module are a light source and a diffractive optical element (DOE). The diffractive optical element (DOE) can modulate a beam, such as splitting an incident beam to generate emergent beams having a specific structured pattern. In a typical solution, a laser transmitter emits a single beam, and the single beam passes through a collimation lens and the diffractive optical element for emitting a laser speckle pattern. The speckle pattern is captured by a corresponding camera for computing a depth image of an object.

The power or distribution of a laser speckle pattern may affect computation precision of a depth image. Higher power may increase the contrast of a pattern, thereby improving computation precision. However, a problem of a zero-order diffraction of the diffractive optical element requires that the power should not be excessively high to avoid a safety problem of a laser. Patent document CN2008801199119 provides a solution that uses two DOEs to solve the problem of the zero-order diffraction. The distribution density and irrelevance of a laser speckle pattern also affect computation precision. For irrelevance of a speckle pattern, a DOE can be designed to project an irregular speckle pattern to improve the irrelevance of the speckle pattern. For the distribution density of a speckle pattern, a magnitude of the density of the speckle pattern may affect the computation precision and resolution. More importantly, whether the density is uniformly distributed directly affects whether depth computations of points in a whole field of view have unified precision. For a speckle pattern having nonuniformly distributed density, distribution nonuniformity of the speckle pattern is exacerbated after the speckle pattern is further modulated by a three-dimensional object in a space, resulting in reduction of final depth computation precision.

A conventional edge-emitting light source can provide sufficient light power, but it is difficult to be used in a miniature structured light projection module due to characteristics of the traditional edge-emitting light source such as a large divergence angle, a large size, and high power consumption. A vertical-cavity surface-emitting laser (VCSEL) becomes a main choice of a light source in a miniature structured light projection module due to characteristics of the VCSEL such as a small size, a small divergence angle, and lower power consumption. Generally, a VCSEL array chip consisting of a plurality of VCSELs is used as a light source. A DOE may diffuse and project the beams of the light source to a target space to form a structured light pattern such as a speckle pattern. The speckle pattern is required to have randomness (irrelevance) and be distributed as uniformly as possible. That is, the density of speckles is uniformly distributed to improve the computation precision of a depth image.

A plurality of reasons may cause the nonuniform density of the speckle pattern. One of the reasons is the diffraction nature of a DOE, that is, as a diffraction angle (or a diffraction order) of the DOE increases, a distribution density of light speckles decreases. Another reason is that when a light source consists of a plurality of sub-light sources, and a DOE synchronously diffracts the plurality of sub-light sources, an arrangement combining the sub-speckle patterns formed by the sub-light sources is likely to result in the nonuniformly distributed density.

Despite of a plurality of advantages, using a VCSEL array chip has a disadvantage. A speckle pattern projected by a structured light projection module can be a speckle pattern formed by combining sub-speckle patterns projected by respective VCSELs. The combination may depend on an arrangement of sub-light sources on the VCSEL array chip. Therefore, the irrelevance of a final speckle pattern can be ensured by designing both an arrangement of the VCSEL array chip and the sub-speckle patterns to be randomly arranged. However, to improve computation precision, that is, to ensure the uniformly distributed density of the speckles, randomness of both the arrangement of the VCSEL array chip and the sub-speckle patterns may decrease the uniformity of a finally projected speckle pattern.

Accordingly, how to ensure that the speckle patterns have high irrelevance while ensuring that the density of speckles is distributed as uniformly as possible is a problem currently faced in designing of a miniature structured light projection module.

SUMMARY

In view of disadvantages of existing technologies, a main objective of the present disclosure is to provide a diffractive optical element and a method using the diffractive optical element to prepare a structured light projection module.

To achieve the foregoing objective, the embodiments of the present disclosure adopt the following technical solutions.

A diffractive optical element is used for a structured light projection module, wherein the structured light projection module comprises a light source, including a plurality of sub-light sources which are arranged in a two-dimensional array and are used for emitting two-dimensional pattern beams consistent with the two-dimensional array. The diffractive optical element is configured to: receive two-dimensional pattern beams and generate multi-order diffractive beams, wherein the two-dimensional pattern beams are emitted from a structured light projection module, the structured light projection module includes a light source comprising a plurality of sub-light sources arranged in a two-dimensional array, and the two-dimensional pattern beams correspond to the two-dimensional array; and project a plurality of two-dimensional patterned beams, wherein the two-dimensional patterned beams do not overlap with each other, each of the plurality of two-dimensional patterned beams creates a corresponding duplicated pattern, and the duplicated patterns form a speckle pattern having the uniform speckle density.

Further, the pitch between adjacent two-dimensional patterned beams is approximately equal to an average spacing between sub-beams in the two-dimensional patterned beams.

The diffractive optical element is configured to allow the duplicated patterns to satisfy the following formula:

$$M \in [(1-\Delta_1)(s+n)D/d, (1+\Delta_2)(s+n)D/d],$$

where M is the average spacing between diffractive speckles generated by the same sub-light source in adjacent duplicated patterns, D is the distance between the diffractive optical element and the projection surface, d is the distance between the light source and the diffractive optical element, s is the size of the area formed by a plurality of sub-light sources, n is the average spacing between adjacent sub-light sources, and both $\Delta_1$ and $\Delta_2$ are specified error percentages.

The two-dimensional array and the speckle pattern are irregularly arranged, and both $\Delta_1$ and $\Delta_2$ are equal to 20%.

A diffractive optical element is used for a structured light projection module, wherein the structured light projection module comprises a light source, including a plurality of sub-light sources which are arranged in a two-dimensional array and are used for emitting two-dimensional pattern beams consistent with the two-dimensional array. The diffractive optical element is configured to: receive two-dimensional pattern beams and generate multi-order diffractive beams, wherein the two-dimensional pattern beams are emitted from a structured light projection module, the structured light projection module includes a light source comprising a plurality of sub-light sources arranged in a two-dimensional array, and the two-dimensional pattern beams correspond to the two-dimensional array; and project a plurality of two-dimensional patterned beams, wherein the two-dimensional patterned beams overlap with each other, each of the plurality of two-dimensional patterned beams creates a corresponding duplicated pattern, and the duplicated patterns form a speckle pattern having the uniform speckle density.

Further, the spacing between the centers of adjacent two-dimensional patterned beams is approximately equal to 1/k of the length of the line connecting the centers of adjacent two-dimensional patterned beams, plus or minus D/d of an average spacing between the sub-light sources, wherein k is a positive integer greater than 1, D is the distance between the diffractive optical element and the projection surface, and d is the distance between the light source and the diffractive optical element.

The diffractive optical element is configured to allow the duplicated patterns to satisfy the following formula:

$$M \in [(1-\Delta_1)(s/k \pm n)D/d, (1+\Delta_2)(s/k \pm n)D/d],$$

where M is the average spacing between diffractive speckles generated by the same sub-light source in adjacent duplicated patterns, D is the distance between the diffractive optical element and the projection surface, d is the distance between the light source and the diffractive optical element, s is the size of an area formed by the plurality of sub-light sources, n is the average spacing between adjacent sub-light sources, both $\Delta_1$ and $\Delta_2$ are specified error percentages, and k is a positive integer greater than 1.

The two-dimensional array and the speckle pattern are irregularly arranged, and preferably, both $\Delta_1$ and $\Delta_2$ are 20%.

A method using the diffractive optical element to prepare a structured light projection module is provided.

The present disclosure has the following benefits.

The present disclosure provides a diffractive optical element (DOE) and a method using the diffractive optical element to prepare a structured light projection module. By configuring the DOE based on a given arrangement pitch of array light sources and according to specified conditions of the present disclosure, a combined speckle pattern having the uniform speckle density can be projected. Compared with existing technologies, not only can the density of the projected speckle pattern in the present disclosure satisfy irrelevance, but also the density is uniformly distributed, and a depth camera based on the structured light projection module can implement high-precision three-dimensional measurement.

DETAILED DESCRIPTION OF THE EMBODIMENTS

Embodiments of the present disclosure are described below in detail. It should be emphasized that the following descriptions are merely exemplary, and are not intended to limit the scope of the present disclosure and applications thereof.

Figure 1:
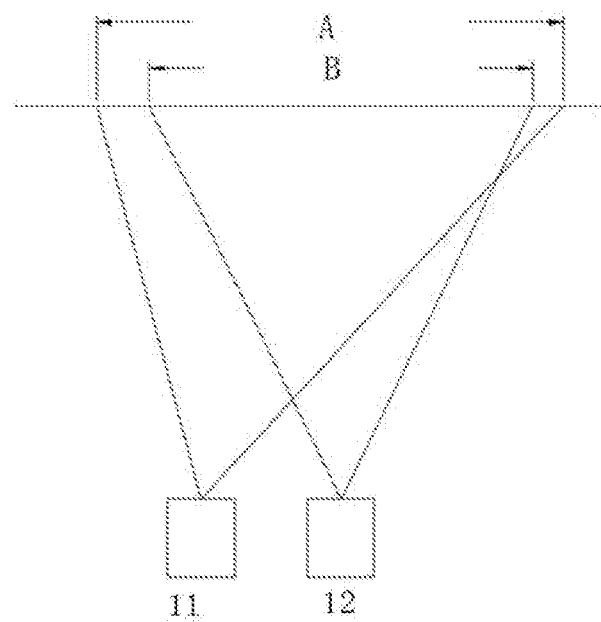
FIG. 1 is a diagram illustrating a principle of a depth camera based on a structured light technology according to an embodiment of the present disclosure.

FIG. 1 is a diagram illustrating a principle of a depth camera based on a structured light technology according to an embodiment of the present disclosure. The depth camera includes a structured light projection module 11 and a capture module 12. The structured light projection module is configured to project the structured light pattern to the projection area A. The capture module is configured to capture a structured light image on an object in the capture area B of the capture module. Generally, the projection area A is not smaller than the capture area B to ensure that objects in the capture area corresponding to the capture module can be covered by the structured light pattern entirely. In addition, the depth camera also includes a processor configured to receive a structured light pattern captured by the capture module and perform depth computing on the structured light pattern to obtain a depth image.

In an embodiment, the structured light projection module is configured to project an infrared speckle pattern, the capture module is a corresponding infrared camera, and the processor is a dedicated SOC chip. When the depth camera is an embedded apparatus integrated into another computing terminal such as a computer, a tablet computer, a mobile phone, or a television, the foregoing functions implemented by the processor can be implemented by a processor or an application in the computing terminal. For example, a depth computing function is stored in a memory in a form of a software module and is called by the processor in the terminal to implement depth computing.

Figure 2:
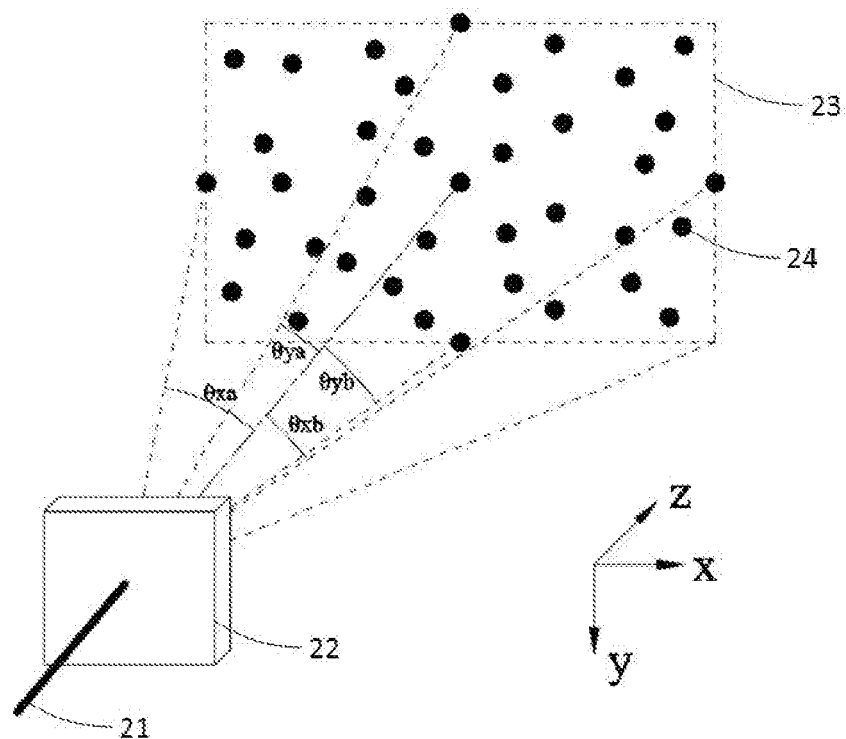
FIG. 2 is a schematic diagram of a speckle pattern formed by a single beam after the single beam passes through a DOE according to an embodiment of the present disclosure.

The structured light projection module comprises a VCSEL array chip, a lens, and a DOE. After the light source beams are converged by the lens, they are modulated by the DOE to a structured light pattern. The structured light pattern, such as a speckle pattern, is emitted into a space. FIG. 2 is a diagram of a speckle pattern formed by a single beam, after the single beam passes through a DOE. A beam 21 is perpendicularly incident to a DOE 22 and after being diffracted, projects a pattern of speckle 24 to a plane at a distance D. A plane where the DOE is located is an xoy plane, and a direction of an optical axis is set to be a z direction. An area formed by the speckle pattern is the area 23, wherein the area 23 refers to a smallest rectangular area 23 capable of including all speckles 24. Adjacent edges of the rectangular area 23 are respectively parallel to the x axis and the y axis. At least one speckle is included on each edge. Generally, a diffraction order of the at least one speckle in the z direction is the highest order. By using the z axis where the optical axis is located as a start point, angles separately formed with four edges of the rectangular area 23 are $\theta_{xa}$, $\theta_{xb}$, $\theta_{ya}$, and $\theta_{yb}$. Using the optical axis as a center, the four angles can represent diffraction divergence angles of the DOE 22, and define an angle range of the diffractive speckle pattern area 23 after the beam 21 passes through the DOE 22.

A position of each speckle 24 in the area 23 is determined by a diffraction equation:

$$\sin \theta_x = m_x \lambda / P_x \quad (1)$$

$$\sin \theta_y = m_y \lambda / P_y \quad (2)$$

where $\theta_x$ and $\theta_y$ respectively represent diffraction angles in the x direction and y direction, $m_x$ and $m_y$ respectively represent diffraction orders in the x direction and y direction, $\lambda$ represents the wavelength of the beam 21, and $P_x$ and $P_y$ respectively represent cycles of the DOE 22 in the x direction and y direction, that is, the size of a basic unit.

An arrangement mode of the speckle patterns 24 depends on diffraction angles of beams in respective diffraction orders of the DOE, and the diffraction angles depend on the performance of the DOE.

FIG. 2 shows a situation in which a beam is perpendicularly incident to the DOE. It should be understood that when the beam is incident at a specific angle, the diffraction area 23 would be deviated from the perpendicular incidence. In addition, when the single light source is replaced with a plurality of sub-light sources, for example, when a VCSEL array chip is used, the diffraction area can be a combination of sub-diffraction areas formed by the individual single beams.

Figure 3:
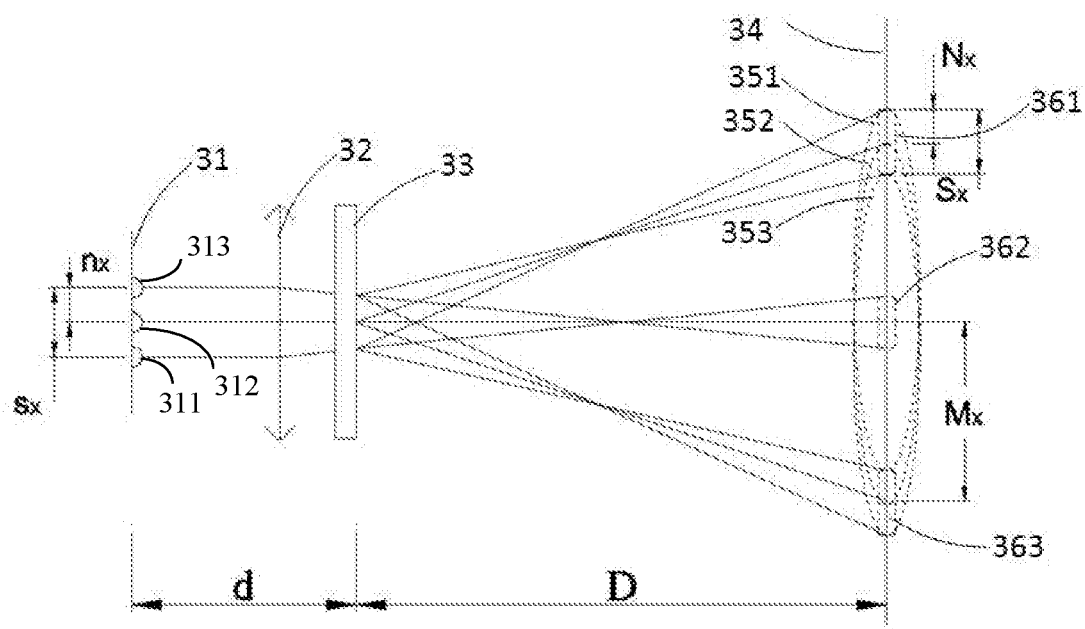
FIG. 3 is a schematic diagram of a structured light projection module according to an embodiment of the present disclosure, where duplicated patterns do not overlap with each other.

FIG. 3 is a schematic diagram of a structured light projection module according to an embodiment of the present invention. The structured light projection module includes an array 31 (for example, a VCSEL array chip) formed by a plurality of light sources, a lens 32, and a DOE 33. For convenience, only 3 sub-light sources 311, 312 and 313 are shown in the FIG. 3 from bottom to top alone the x direction. In an embodiment, the quantity of the light sources may reach dozens or even tens of thousands. The light sources may also be arranged in a two-dimensional manner, and an arrangement manner may be regular or irregular. In the following description, only a one-dimensional regular arrangement situation is described, and other situations are also applicable to the following descriptions.

Beams emitted from the light source array 31 may form patterned beams which may be consistent with the arrangement of the light source. The patterned beams are converged by the lens 32 and then are incident to the DOE 33. The DOE 33 projects a speckle pattern to a plane at a distance D to a space. The spacing between the sub-light sources 31 is $n_x$, and the size of the area where the sub-light sources are located is $s_x$. If the sub-light sources are arranged in a two-dimensional manner, the spacing can be represented by n ($n_y$, $n_y$). Likewise, the size of the area where the sub-light sources are located is s ($s_x$, $s_y$), the distance between the light source 31 and the DOE 33 is d, and in some embodiments, d is approximately equal to the focal length of the lens 32.

The lens 32 may a single lens or a lens combination formed by a plurality of lenses, and is configured to collimate beams emitted from the light sources in some embodiments.

Because the sub-light sources are irrelevant light sources, an interference effect among the sub-light sources can be omitted. After passing through the DOE 33, beams emitted from the sub-light sources 311, 312 and 313 are respectively form the sub-speckle patterns 351, 352 and 353 (which are represented by elliptical dotted lines in the figure), and a final speckle pattern is formed by combining the sub-speckle patterns 351, 352 and 353. In an embodiment shown in FIG. 3, because a diffraction divergence angle of the DOE 33 is large, the sub-speckle patterns may overlap with each other. In some embodiments, the diffraction divergence angle of the DOE 33 can be set to adjust an overlap degree. In an embodiment shown in FIG. 4, the sub-speckle patterns 451, 452 and 453 do not overlap with each other.

In FIG. 3, each sub-speckle pattern is formed by 3 speckles respectively corresponding to −1, 0, and 1 order diffractive beams, which is merely used for illustration. Actually, the number of speckles may be any, and the speckles may be distributed in a two-dimensional manner. For grating diffraction, when a light source moves in a direction parallel to a grating plane, a diffractive beam of the light source also moves accordingly, that is, a light speckle moves according to the following formula $$T = tD/d \qquad (3),$$

where, t and T respectively represent the translation quantity of the light source and the translation quantity of the diffractive light speckle. Therefore, a speckle pattern formed by one sub-light source can be a speckle pattern formed by translating another sub-light source. The distance between diffractive light speckles in corresponding orders in two sub-speckle patterns and the distance between the two sub-light sources depends on the foregoing formula (3).

Therefore, the size of the areas (which are 361, 362 and 363, shown by elliptical dotted lines in the figure) jointly formed by light speckles of the same diffraction order corresponding to a plurality of sub-light sources and the spacing between the speckles in the areas may be computed by the following formula:

$$N_x = n_x D/d \qquad (4)$$

$$S_x = s_x D/d \qquad (5)$$

where, $S_x$ represents the size of the area formed by light speckles in the same order, and $N_x$ represents the spacing between the speckles in the area. According to the formulas (4) and (5), relationships between the size of the area and the spacing between the speckles in the area and the size of the light source 31 and the spacing between the sub-light sources are consistent with those of a lens pinhole imaging model. Thus, the areas 361, 362 and 363 can be regarded as images formed by the light source 31. That is, final projected diffractive beams are formed by combining patterned beams emitted by a plurality of duplicated light sources. In other words, the speckle pattern finally formed on the plane 34 is formed by combining arranged patterns of a plurality of duplicated light sources. In FIG. 3, the duplicated patterns 361, 362 and 363 do not overlap with each other. In some embodiments, duplicated patterns may overlap with each other. For example, in an embodiment shown in FIG. 4, duplicated patterns 461, 462 and 463 overlap with each other. The spacing $M_x$ between diffractive speckles in adjacent orders may be used for determining whether the duplicated patterns overlap with each other, and the distance depends on the performance of the DOE.

Figure 4:
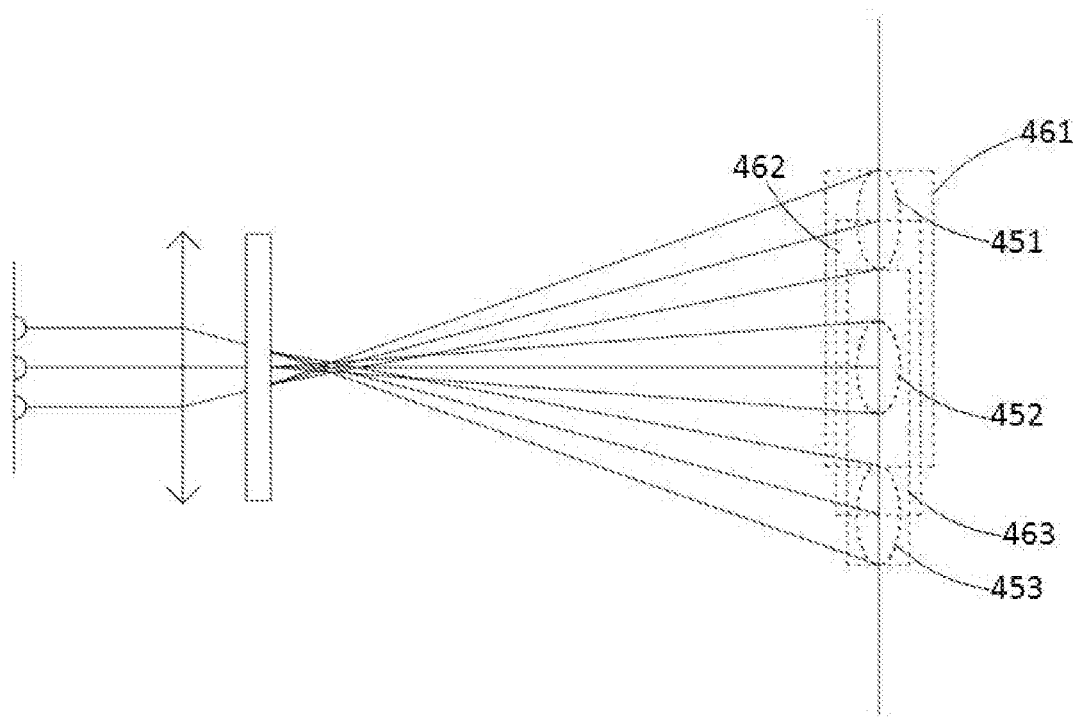
FIG. 4 is a schematic diagram of a structured light projection module according to an embodiment of the present disclosure, where duplicated patterns overlap with each other.
Figure 5:
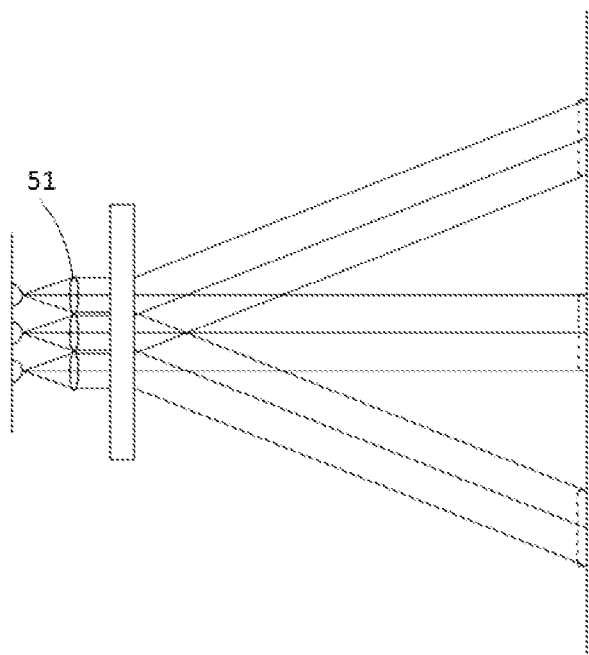
FIG. 5 is a schematic diagram of a structured light projection module according to an embodiment of the present disclosure, where a lens is a microlens array.

In embodiments shown in FIG. 3 and FIG. 4, the light sources are distributed near the optical axis of the lens. Therefore, the centers of the light beams of the sub-light sources away from the optical axis and converging through the lens are no longer parallel to the optical axis. The deviation may cause distortion of duplicated patterns away from the optical axis, resulting in a nonuniform density of an overall speckle pattern. The nonuniformity can be eliminated by downsizing the light sources as much as possible, while the distortion of the duplicated patterns can be alleviated by changing a form of a lens. For example, the lens 51 is a microlens array in an embodiment shown in FIG. 5. Although the distortion in the embodiment shown in FIG. 5 becomes smaller, an overall diffraction angle of the lens 51 also becomes smaller than diffraction angles in the embodiments in FIG. 3 and FIG. 4.

In addition to the above distortion affecting the density distribution, the spacing of the light sources arrangement and performance of the DOE may also affect the density distribution, such as the spacing between speckles in different diffraction orders. The density of a final speckle pattern is uniformly distributed when certain constraints between the spacing of the light sources and the performance of the DOE are satisfied. Detailed descriptions are provided below.

In the embodiment shown in FIG. 3, the speckle pattern projected by the structured light projection module can be regarded as a speckle pattern combining sub-speckle patterns formed by respectively diffracting a plurality of sub-light sources. It can also be regarded as a speckle pattern formed by combining duplicated patterns of arranged patterns of a plurality of light sources. In the following description, the present disclosure is described by using the latter.

Figure 6:
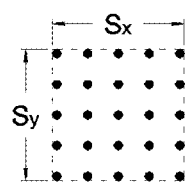
FIG. 6 is a schematic diagram of a duplicated pattern according to an embodiment of the present disclosure, where one duplicated pattern is formed by light speckles which have the same diffraction order and correspond to a plurality of sub-light sources.

The following description is still based on selecting a plane away from the DOE at a distance D and regularly arranged two-dimensional light sources. The size of a light source array is s ($s_x$, $s_y$), and the spacing between sub-light sources is n ($n_x$, $n_y$). Therefore, as shown in FIG. 6, the size of a duplicated pattern formed on the plane at the distance D is S ($S_x$, $S_y$), and the spacing between speckles in the pattern is N ($N_x$, $N_y$), which satisfy the following formulas:

$$N = nD/d \qquad (6)$$

$$S = sD/d \qquad (7)$$

Figure 7:
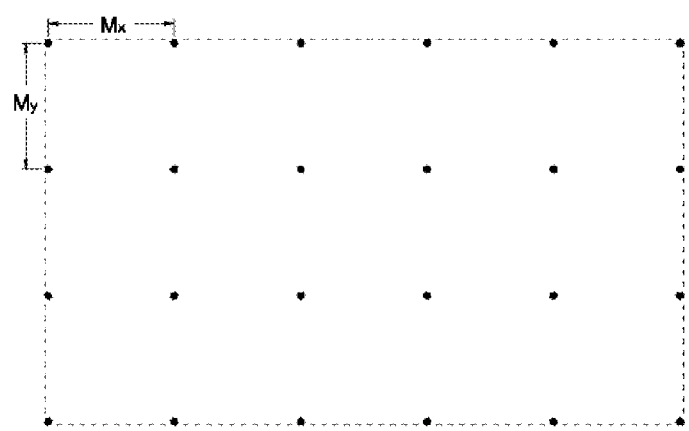
FIG. 7 shows a speckle pattern formed by a single beam on a plane at a distance D after the single beam is incident to a DOE, where different speckles represent different diffraction orders.
Figure 8:
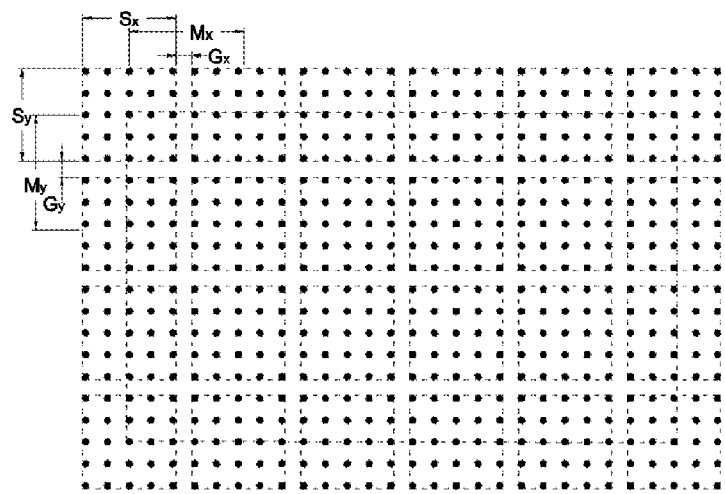
FIG. 8 is a schematic diagram of a final speckle pattern formed by making the centers of duplicated patterns corresponding to different diffraction orders coincide with the speckles in FIG. 7.

The final speckle pattern formed on the plane at the distance D is formed by arranging a plurality of duplicated patterns at a specific spacing, where the spacing represents a spacing between speckles in different diffraction orders after the DOE performs diffraction. The density distribution of the speckle pattern depends on the speckle distribution and spacing between the duplicated patterns. FIG. 6 is a schematic diagram of a duplicated pattern, where the size of the duplicated pattern is S ($S_x$, $S_y$), and the spacing between speckles in the pattern is N ($N_x$, $N_y$). FIG. 7 shows a speckle pattern formed on a plane at a distance D after a single beam is incident to the DOE, where different speckles represent different diffraction orders. The spacing between adjacent diffraction orders is M ($M_x$, $M_y$). A final speckle pattern formed by the structured light projection module can be regarded as a speckle pattern combining the duplicated patterns shown in FIG. 6 according to the arrangement in FIG. 7. As shown in FIG. 8, one of various combinations for forming the final speckle pattern is that the centers of the duplicated patterns coincide with the speckles in FIG. 7.

In speckle patterns formed by the projection module shown in FIG. 8, M>S, (($M_x$>$S_x$) & ($M_y$>$S_y$)), the adjacent duplicated patterns do not overlap with each other, and the spacing G($G_x$, $G_y$)=M−S. It should be understood that the spacing G determines the density distribution of the speckle patterns. When G($G_x$, $G_y$)=N ($N_x$, $N_y$), such that the spacing between adjacent duplicated patterns is the same as the spacing between speckles in the duplicated patterns, the density distribution is most uniform, and the density of combined speckle patterns is equal to the density of duplicated patterns. In this case, $$M - S = N \qquad (8)$$

Figure 9:
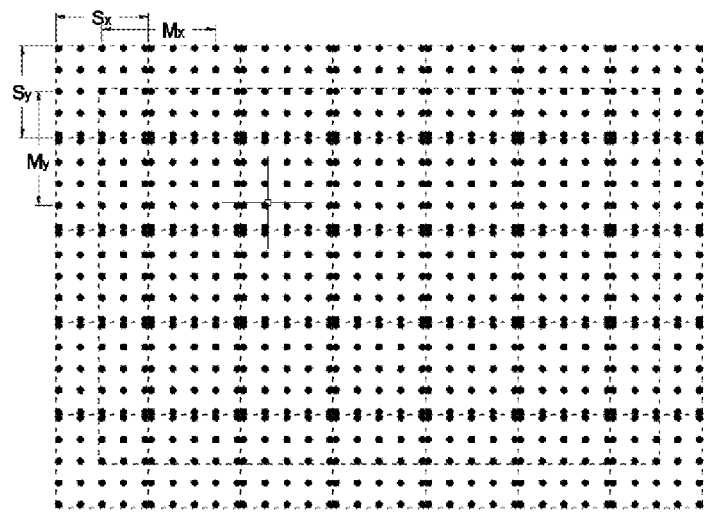
FIG. 9 is a schematic diagram of a situation in which adjacent duplicated patterns slightly overlap with each other, that is, the adjacent duplicated patterns are connected.

In an embodiment, the adjacent duplicated patterns may just overlap with each other at the edges, that is, the adjacent duplicated patterns are connected. In this case, M=S, and the combined speckle patterns are shown in FIG. 9. The speckles of the duplicated patterns almost coincide. It is an ideal situation, but an error exists in fact, resulting in the remarkable increase of the speckles density in adjacent parts and nonuniform distribution of the overall density.

Figure 10:
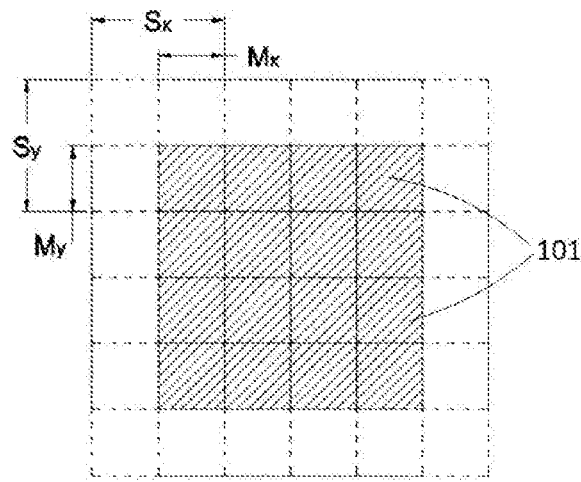
FIG. 10 is a schematic diagram of a situation in which adjacent duplicated patterns overlap with each other, where M=S/2 (for convenience of illustration, speckles are not drawn in the figure).

In some embodiments, adjacent duplicated patterns overlap with each other, and in this case, M<S. FIG. 10 is a schematic diagram of a combined pattern when M=S/2. For convenience of illustration, speckles are not drawn in the figure. It can be seen from FIG. 10 that the density of speckles in the shaded area is greater than that of duplicated patterns due to mutually overlapping. Because M=S/2, each small area 101 (e.g., an area is ¼ of the duplicated pattern) in the shaded area is formed by overlapping a quadrant of each of 4 adjacent duplicated patterns, and the density of the combined pattern is 4 times than that of the duplicated patterns. Because all the duplicated patterns are same, the speckle pattern in each small area is formed by combining areas of four quadrants in the duplicated patterns. It can be seen from FIG. 10 that the density of an edge area is apparently lower than that of an overlapped area. Generally, only the overlapped area is used as an effective projection area.

Figure 11:
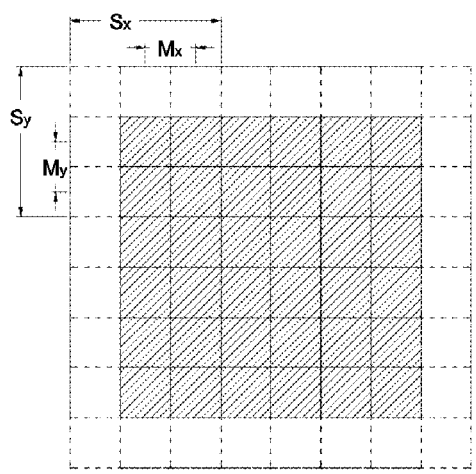
FIG. 11 is a schematic diagram of a situation in which adjacent duplicated patterns overlap with each other, where M=S/3 (for convenience of illustration, speckles are not drawn in the figure).

FIG. 11 shows a situation in which M=S/3. It can be seen that the area of each small area in an overlapped area is ⅑ of that of duplicated patterns, and a speckle pattern in each small area is formed by overlapping different parts (e.g., ⅑ of each duplicated pattern) of 9 duplicated patterns, and the density of the small area is approximately 9 times than that of the duplicated patterns.

Likewise, it can be derived that the density of an effective projection area in the overlapped part is approximately $k_x \cdot k_y$ times than that of the duplicated patterns when M=S/k, where $k=(k_x \cdot k_y)$, and $k_x$, $k_y$=2, 3, 4, . . . . It should be understood that in the embodiments shown in FIG. 10 and FIG. 11, $k_x=k_y$, and different values may be set in other embodiments.

Figure 12:
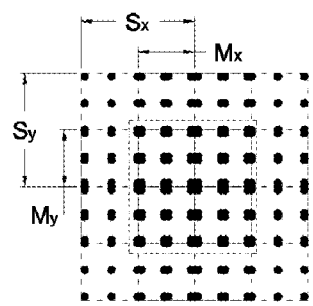
FIG. 12 shows a specific speckle pattern according to an embodiment shown in FIG. 10.
Figure 13:
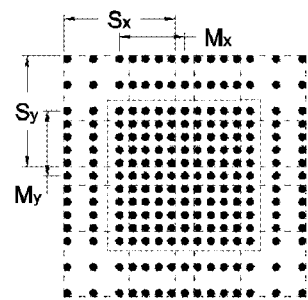
FIG. 13 shows a situation in which the spacing is changed based on FIG. 12 to make M=S/2±N.

FIG. 12 shows a specific speckle pattern in the embodiment shown in FIG. 10. It can be seen from the figure that the density of speckles at an edge of each small area of the overlapped area is higher, resulting in nonuniform distribution. To make the density uniform, the spacing M may be increased, or the spacing N may be decreased, that is, M=S/2±N. FIG. 13 shows a situation in which M=S/2+N, where it can be seen that the uniformly distributed density of speckles in the overlapped area (the projection effective area) is achieved. When K is set to another value, the condition for achieving uniform density is:

$$M=S/K\pm N \quad (9)$$

It should be noted that a division sign herein indicates that an S vector is correspondingly divided by each element in a K vector.

When K is a non-integer, it can be analyzed from FIG. 10 or FIG. 11 that some spacer areas may occur among the formed small areas. An apparent difference exists between the density of the spacer areas and the density of the small areas, resulting in a nonuniformly distributed density.

It can be known from the above analysis that when a pitch exists between the duplicated patterns, the uniformly distributed density can be achieved provided that the formula (8) is satisfied, and when the duplicated patterns overlap with each other, the uniformly distributed density can be achieved provided that the formula (9) is satisfied.

By substituting the formula (6) and the formula (7) into the formula (8) and the formula (9), the following can be obtained:

$$M=(s+n)D/d \quad (10)$$

$$M=(s/k\pm n)D/d, k=2,3,4 \quad (11)$$

The formula (10) and the formula (11) provide a relationship between sizes and the spacing of light sources and the performance of the DOE, which is required for generating speckle patterns with the uniformly distributed density. Therefore, when the light sources and the DOE are designed, the structured light projection module may generate speckle patterns with the uniformly distributed density provided that the formula (10) and the formula (11) are satisfied.

In the foregoing explanations, an arrangement of light sources and an arrangement of patterns after the DOE performs diffraction are described using regular arrangements as examples. Because randomness (irrelevance) is another requirement of speckle patterns, generally, to meet the requirement, the arrangement of the light sources and the arrangement of DOE-diffracted patterns are both arranged irregularly.

However, the above analysis on the regular arrangement is also applicable to an irregular arrangement because the irregular arrangement can be regarded as an irregular arrangement converted from the regular arrangement by using an algorithm. If R represents a regular arrangement, I represents an irregular arrangement, and f represents a conversion algorithm, the following is obtained:

$$I=f\cdot R \quad (12)$$

To satisfy the requirement that the structured light projection module can project a speckle pattern with uniformly distributed density and irrelevant distribution of speckles, when designing the arrangement of light sources and DOEs, the design can be performed first by a regular arrangement, and then, the regular arrangement is converted into an irregular arrangement by using the random change algorithm.

For the irregular arrangement of the light resources and the arrangement of the sub-speckle patterns obtained by diffracting a single beam by the DOE, when the arrangements are both irregular arrangements, pitches of the arrangements generally represent the average pitches, that is, n, N, and M in the foregoing context all represent average pitches. This average pitch can represent the average of all the pitches, and can be represented by using the ratio of the total area to the quantity of light sources or speckles. Due to randomness, when the pitches are represented by the average pitches, the foregoing formulas are not established in the strict sense. Therefore, when designing the light source and the DOE, it is acceptable that the formula (10) and formula (11) are approximately satisfied. That is, it is acceptable that equal signs in the formulas may be replaced with approximately equal signs. An error range can also be set to, for example, ±20%. That is, it is acceptable that the formula (10) and the formula (11) satisfy the following formula:

$$M\in[0.8(s+n)D/d, 1.2(s+n)D/d] \quad (13)$$

$$M\in[0.8(s/k\pm n)D/d, 1.2(s/k\pm n)D/d], k=2,3 \quad (14)$$

For a given light array, a problem of nonuniformly distributed density of the projected pattern can be resolved by setting the DOE according to the above conditions.

The above contents are further detailed with reference to specific preferred implementations, and it cannot be considered that the specific implementations of the present disclosure are limited to these descriptions. A person of ordinary skill in the technical field of the present disclosure may make substitutions or variations on the described implementations without departing from the idea of the present disclosure, and the substitutions or variations shall fall within the protection scope of the present disclosure.

What is claimed is:

1. A diffractive optical element, configured to:
   receive two-dimensional pattern beams and generate multi-order diffractive beams, wherein the two-dimensional pattern beams are emitted from a structured light projection module, the structured light projection module includes a light source comprising a plurality of sub-light sources arranged in a two-dimensional array, and the two-dimensional pattern beams correspond to the two-dimensional array; and
   project the multi-order diffractive beams to form a speckle pattern on a projection surface, the speckle pattern comprising a plurality of duplicated spot patterns, wherein each of the plurality of duplicated spot patterns comprises diffractive speckles at a same diffraction order, centers of the duplicated spot patterns are respectively placed at positions of diffractive speckles of the diffractive optical element, speckles in each of the plurality of duplicated spot patterns are irregularly arranged, and when the duplicated spot patterns do not overlap with each other and the duplicated spot patterns satisfy the following formula such that the speckle pattern has a uniform speckle density:

$M \in [(1-\Delta 1)(s+n)D/d, (1+\Delta 2)(s+n)D/d]$, where M is an average spacing between every two adjacent diffractive speckles generated by a sub-light source, D is a distance between the diffractive optical element and the projection surface where the speckle pattern is formed, d is a distance between the light source and the diffractive optical element, s is a size of an area formed by the plurality of sub-light sources, n is an average spacing between every two adjacent sub light sources, and both $\Delta 1$ and $\Delta 2$ are specified error percentages of 20%.

2. The diffractive optical element according to claim 1, wherein a pitch between adjacent duplicated spot patterns is approximately equal to an average spacing between every two adjacent speckles of the diffractive speckles of the diffractive optical element.

3. The diffractive optical element according to claim 1, wherein the diffractive speckles of the diffractive optical element are generated by projecting a single beam from a sub-light source to the projection surface.

4. A diffractive optical element, configured to:
   receive two-dimensional pattern beams and generate multi-order diffractive beams, wherein the two-dimensional pattern beams are emitted from a structured light projection module, the structured light projection module includes a light source comprising a plurality of sub-light sources irregularly arranged in a two-dimensional array, and the two-dimensional pattern beams correspond to the two-dimensional array; and
   project the multi-order diffractive beams to form a speckle pattern on a projection surface, the speckle pattern comprising a plurality of duplicated spot patterns, wherein each of the plurality of duplicated spot patterns comprises diffractive speckles at a same diffraction order, centers of the duplicated spot patterns are respectively placed at positions of diffractive speckles of the diffractive optical element, speckles in each of the plurality of duplicated spot patterns are irregularly arranged, and when the duplicated spot patterns overlap with each other and the duplicated spot patterns satisfy the following formula such that the speckle pattern has a uniform speckle density:

$M \in [(1-\Delta 1)(s/k \pm n)D/d, (1+\Delta 2)(s/k \pm n)D/d]$, where M is an average spacing between every two adjacent diffractive speckles generated by a sub-light source, D is a distance between the diffractive optical element and the projection surface where the speckle pattern is formed, d is a distance between the light source and the diffractive optical element, s is a size of an area formed by the plurality of sub-light sources, n is an average spacing between every two adjacent sub-light sources, both $\Delta 1$ and $\Delta 2$ are specified error percentages of 20%, and k is a positive integer greater than 1.

5. The diffractive optical element according to claim 4, wherein the diffractive speckles of the diffractive optical element are generated by projecting a single beam from a sub-light source to the projection surface.

6. A method comprising:
   receiving two-dimensional pattern beams on a diffractive optical element, wherein the two-dimensional pattern beams are emitted from a structured light projection module, the structured light projection module includes a light source comprising a plurality of sub-light sources arranged in a two-dimensional array, and the two-dimensional pattern beams correspond to the two-dimensional array; and
   projecting the multi-order diffractive beams to form a speckle pattern on a projection surface, the speckle pattern comprising a plurality of duplicated spot patterns by the diffractive optical element, wherein each of the plurality of duplicated spot patterns comprises diffractive speckles at a same diffraction order, centers of the duplicated spot patterns are respectively placed at positions of diffractive speckles of the diffractive optical element, speckles in each of the plurality of duplicated spot patterns are irregularly arranged, and when the duplicated spot patterns do not overlap with each other and satisfy a first formula or when the duplicated spot patterns overlap with each other and satisfy a second formula, such that the speckle pattern has a uniform speckle density,
   wherein the first formula is:

$M \in [(1-\Delta 1)(s+n)D/d, (1+\Delta 2)(s+n)D/d]$, where M is an average spacing between every two adjacent diffractive speckles generated by a sub-light source, D is a distance between the diffractive optical element and the projection surface where the speckle pattern is formed, d is a distance between the light source and the diffractive optical element, s is a size of an area formed by the plurality of sub-light sources, n is an average spacing between every two adjacent sub light sources, and both $\Delta 1$ and $\Delta 2$ are specified error percentages of 20%, and
   wherein the second formula is:

$M \in [(1-\Delta 1)(s/k \pm n)D/d, (1+\Delta 2)(s/k \pm n)D/d]$, where k is a positive integer greater than 1.

7. The method according to claim 6, wherein a pitch between adjacent duplicated spot patterns is approximately equal to an average spacing between every two adjacent speckles of the diffractive speckles of the diffractive optical element.

8. The method according to claim 6, wherein the diffractive speckles of the diffractive optical element are generated by projecting a single beam from a sub-light source to the projection surface.

* * * * *

UNITED STATES PATENT AND TRADEMARK OFFICE
CERTIFICATE OF CORRECTION

PATENT NO. : 11,442,285 B2
APPLICATION NO. : 16/510446
DATED : September 13, 2022
INVENTOR(S) : Xing Xu and Xu Chen It is certified that error appears in the above-identified patent and that said Letters Patent is hereby corrected as shown below:

In the Claims

In Claim 4, Column 11, Line 51, "sub-light sources irregularly arranged in a two-dimensional" should read --sub-light sources arranged in a two-dimensional--.

Signed and Sealed this
Twentieth Day of December, 2022

Katherine Kelly Vidal
*Director of the United States Patent and Trademark Office*